United States Patent
Gooding et al.

(10) Patent No.: US 8,250,383 B2
(45) Date of Patent: Aug. 21, 2012

(54) TEMPERATURE THRESHOLD APPLICATION SIGNAL TRIGGER FOR REAL-TIME RELOCATION OF PROCESS

(75) Inventors: Thomas M. Gooding, Rochester, MN (US); Brant L. Knudson, Rochester, MN (US); Cory Lappi, Rochester, MN (US); Ruth J. Poole, Rochester, MN (US); Andrew T. Tauferner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1153 days.

(21) Appl. No.: 12/109,579

(22) Filed: Apr. 25, 2008

(65) Prior Publication Data
US 2009/0271608 A1    Oct. 29, 2009

(51) Int. Cl.
G06F 1/26    (2006.01)
G06F 11/00    (2006.01)
(52) U.S. Cl. .................. 713/300; 718/104; 709/226
(58) Field of Classification Search .................. 713/300; 718/104; 709/226
See application file for complete search history.

(56) References Cited

U.S. PATENT DOCUMENTS

| | | | | |
|---|---|---|---|---|
| 6,775,787 B2* | 8/2004 | Greene | ......................... | 713/340 |
| 7,173,821 B2* | 2/2007 | Coglitore | ...................... | 361/695 |
| 7,426,453 B2* | 9/2008 | Patel et al. | ..................... | 702/185 |
| 7,447,920 B2* | 11/2008 | Sharma et al. | ................ | 713/300 |
| 7,953,957 B2* | 5/2011 | Gooding et al. | ................ | 712/28 |
| 2003/0229662 A1* | 12/2003 | Luick | ............................ | 709/106 |
| 2005/0216775 A1* | 9/2005 | Inoue | ........................... | 713/300 |
| 2007/0180117 A1* | 8/2007 | Matsumoto et al. | ........... | 709/226 |

FOREIGN PATENT DOCUMENTS

JP    2004-126968    *    4/2004

* cited by examiner

*Primary Examiner* — Chun Cao
(74) *Attorney, Agent, or Firm* — Cantor Colburn LLP

(57) ABSTRACT

A method of managing a process relocation operation in a computing system is provided and includes determining respective operating temperatures of first, second and additional nodes of the system, where the first node has an elevated operating temperature and the second node has a normal operating temperature, notifying first and second kernels respectively associated with the first and second nodes, of a swapping condition, initially managing the first and second kernels to swap an application between the first and the second nodes while the swapping condition is in effect, and secondarily managing the first and second kernels to perform a barrier operation to end the swapping condition.

22 Claims, 2 Drawing Sheets

Figure 1:
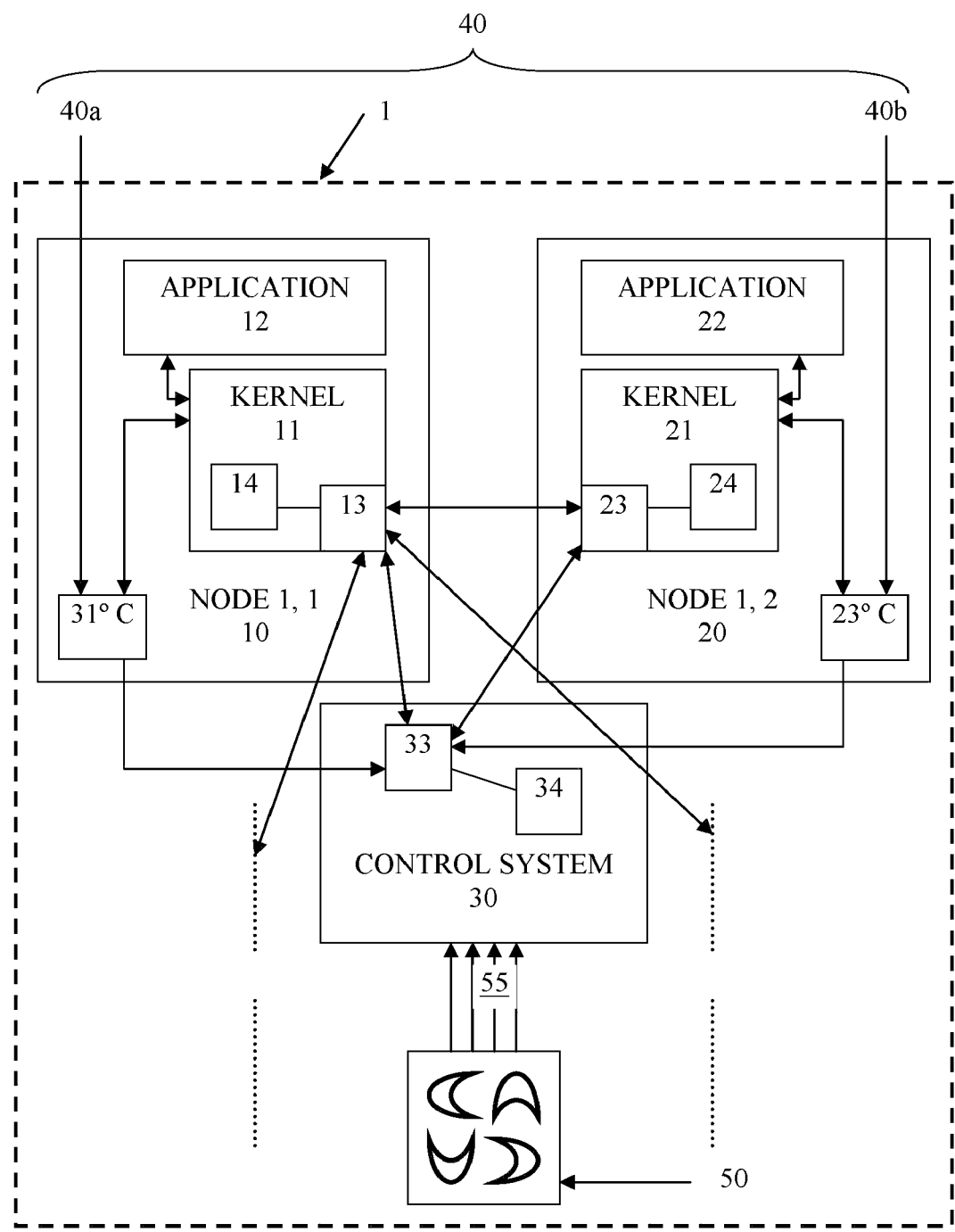

TEMPERATURE THRESHOLD APPLICATION SIGNAL TRIGGER FOR REAL-TIME RELOCATION OF PROCESS

BACKGROUND OF THE INVENTION

1. Field of the Invention

Aspects of the present invention are directed to a method and a system for process relocation and, more particularly, to a method and a system for process relocation based on a temperature threshold.

2. Description of the Background

In conventional computing environments, computing systems include racks of components running various applications simultaneously. Since many of these components run continuously, it is necessary to provide the components with a cooling system that is configured to prevent the operating temperatures of the components from increasing beyond dangerous levels. The cooling systems thereby serve to maintain operating efficiencies of the components and prevent damages that may result from highly elevated operating temperatures.

Typically, a conventional cooling system for a computing system includes devices and apparatuses that are configured to generate airflow over and/or through the components. This airflow may be fed from external air and/or recycled air and tends to remove heat generated by the computing system from the components to thereby cool the components during computing operations.

A problem with the conventional cooling system persists, however, in that the airflow may be insufficient to cool each of the components. This may be due to the fact that the heat generated by the computing system overwhelms the ability of the airflow to remove heat from the components or the fact that the airflow may not be effectively administered to each component. In any case, where particular components are not sufficiently cooled by the conventional cooling system, damage to the components may ensue.

SUMMARY OF THE INVENTION

In accordance with an aspect of the invention, a computing system in which process relocation operations are managed is provided and includes a set of nodes, including a first node to run an application and other nodes, a temperature measurement system configured to determine an operating temperature of each of the nodes, and a set of kernels, respectively installed in each of the nodes, which are configured to communicate with one another and the temperature measurement system to thereby swap the running of the application from the first node to another node when the operating temperatures of the first node and the other node are each determined to be elevated and normal, respectively.

In accordance with another aspect of the invention, a computing system in which process relocation operations are managed is provided and includes a set of nodes, including a first node to run an application and other nodes, a temperature measurement system configured to determine an operating temperature of each of the nodes, a control system configured to communicate with the temperature measurement system to compile the operating temperatures of each of the nodes, and a set of kernels, respectively installed in each of the nodes, which are configured to communicate with one another and the control system to thereby swap the running of the application from the first node to another node when the operating temperatures of the first node and the other node are each determined to be elevated and normal, respectively.

In accordance with another aspect of the invention, a method of managing a process relocation operation in a computing system is provided and includes determining respective operating temperatures of first, second and additional nodes of the system, where the first node has an elevated operating temperature and the second node has a normal operating temperature, notifying first and second kernels respectively associated with the first and second nodes, of a swapping condition, initially managing the first and second kernels to swap an application between the first and the second nodes while the swapping condition is in effect, and secondarily managing the first and second kernels to perform a barrier operation to end the swapping condition.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTIONS OF THE DRAWINGS

Figure 2:
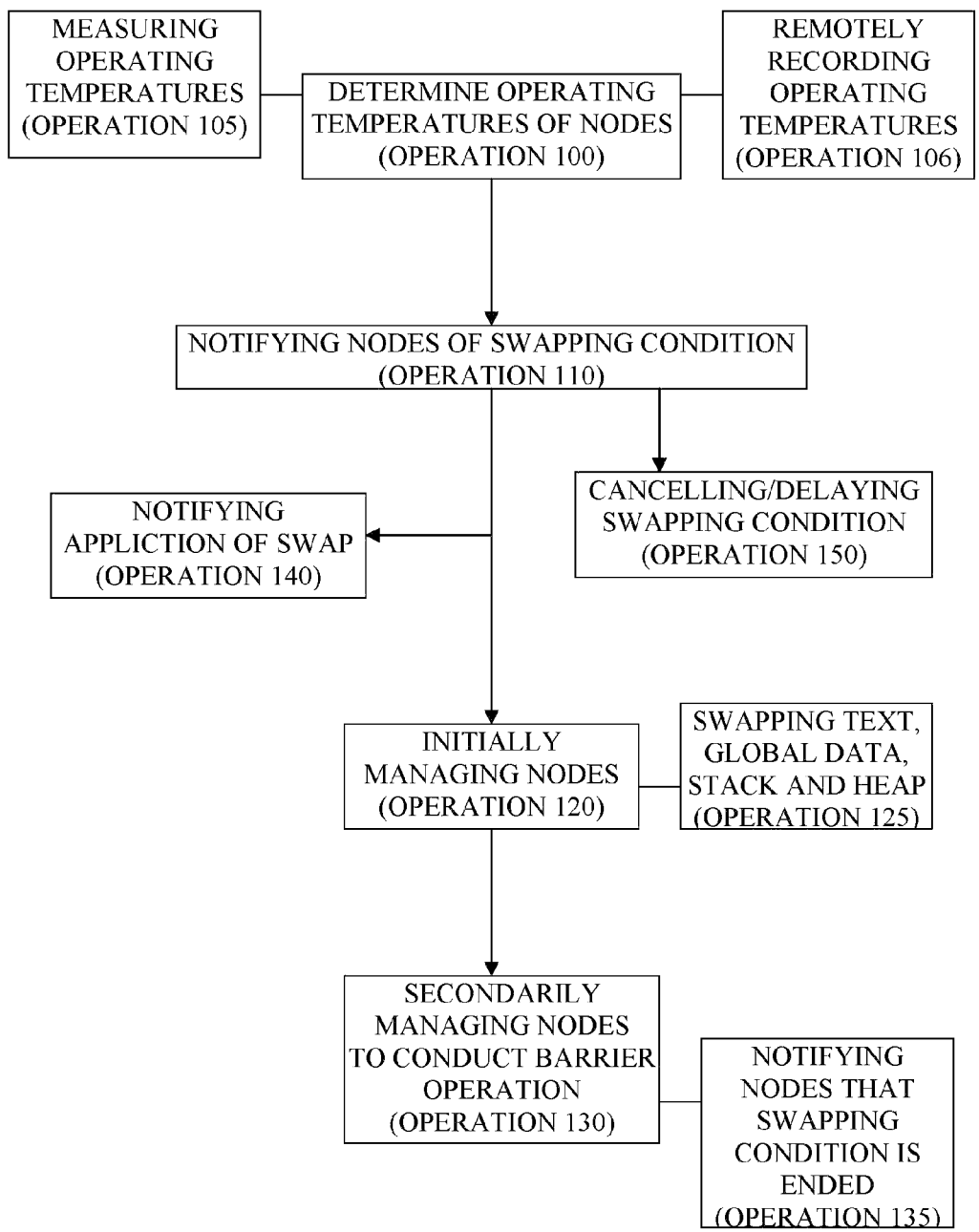

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a view of a computing system according to embodiments of the invention; and FIG. 2 is a flow diagram illustrating a method of managing a process relocation operation in a computing system according to embodiments of the invention.

DETAILED DESCRIPTION OF THE INVENTION

With reference to FIG. 1, a computing system 1 is provided in which process relocation operations are managed in accordance with measured operating temperatures of nodes 10 and 20. The computing system 1 may be any computing apparatus, such as a rack mounted set of individual devices (e.g., personal computers, networked computers and/or servers). Each individual device is a node 10 and 20 and, while FIG. 1 provides an illustration of two devices, the computing system 1 will likely include many more. In addition, according to embodiments of the invention, a cooling system 50, such as a fan, may be provided proximate to the computing system 1 to generate airflow 55 that serves to partially cool the nodes 10 and 20.

Each of the nodes 10 and 20 includes a kernel 11 and 21 and is configured to allow an application 12 and 22 to run thereon. That is, each node 10 and 20 may be provided with an appropriate file system and memory along with components installed therein that are sufficient for running the application 12 and 22. In particular, where the application 12 runs on the node 10, the kernel 11 manages the performance and the operation of the application 12. In this capacity, the kernel 11 is configured to communicate with various other components, such as the kernel 21, the control system 30 (where appropriate) and the temperature measurement unit 40.

The temperature measurement system 40 is configured to determine an operating temperature of each of the nodes 10 and 20. In this capacity, the temperature measurement system 40 may include temperature gauges 40a and 40b that are local to nodes 10 and 20, respectively, or some other suitable device for temperature measurement of the nodes 10 and 20 that may either be local to the nodes 10 and 20 or remote. Further, the temperature measurement system 40 may be configured to communicate such measurements to the kernels 11 and 21 and, where appropriate, to the control system 30. This way, when the operating temperature of node 10 is elevated and the operating temperature of node 20 is normal, as shown in FIG. 1, appropriate measures may be taken to mitigate any issues that may arise.

One such measure involves the swap of the running of the application 12 from node 10 to node 20. The swap may include simply ending the running of the application 12 on node 10 and starting the same on node 20 and/or additionally moving text, global data, stack and heap of the application 12 between node 10 and node 20. Following the swap, at least one of the kernels 11 and 21 may notify the application 12 of the swap and at least one of the kernels 11 and 21 may perform a barrier operation. The barrier operation may include the sending of a signal to the various kernels that indicates that the swap has occurred and that an additional swap is not currently required.

In this way, node 10 may be given an opportunity to at least partly shut down and cool while node 20 runs the application 12. While application 12 may experience a delay during the swap, a length of such a delay will be shorter than the time lost due to the running of the application 12 slowly on an overheated node 10 or a crash of node 10. It is further understood that node 20 may not have all of the necessary software installed therein to run application 12 when the swap occurs. As such, a length of any delay during the swap may be increased if node 20 requires that a software installation operation be conducted before the application 12 can be run thereon. Even in this case, however, a length of any delay will still be relatively short.

As an additional matter, as long as the risk of running the application 12 on node 10 is determined to be below a certain risk-level threshold, such as a situation in which the application 12 will be expected to run slowly but not crash, the swap from node 10 to node 20 may be overridden even where the operating temperatures of nodes 10 and 20 are elevated and normal, respectively. Here, if node 10 includes a much faster processor than node 20 or if node 20 is already fully queued with application 22 or other work, it may be determined that the swap will not result in an advantageous situation. In this case, the swap may be delayed or cancelled until more advantageous circumstances arise. Alternatively, the swap may be delayed while a search for a more available node is conducted.

As a further additional matter, it is understood that the application 12 may be swapped from node 10 to more than one node if the target nodes are available, found to have normal operating temperatures, and if the nodes are known to have the capability of running application 12 together.

In accordance with at least a first embodiment of the invention, the kernel 11 of the first node 10 is configured to be interrupted upon the determination that the operating temperature of the first node 10 is elevated. Here, the interruption of the kernel 11 may include an automatic interruption of the running of the application 12 so as to allow for an immediate partial shut down of node 10 for cooling purposes. Alternatively, the interruption may be simply a notification of the overheated condition of node 10 that indicates to the kernel 11 that other systems within node 10 may need to be temporarily shut down, that a search for another node to swap application 12 with is required or a combination of these items and others.

Once the kernel 11 is notified of the overheated condition of the node 10, the kernel 11 communicates with the kernel 21 of node 20 and any other kernels of present nodes. This communication may include a broadcast from kernel 11 to at least kernel 21 that the operating temperature of the first node 10 is elevated, a request for data reflective of the operating temperature of node 20, and a reception of the operating temperature data. Assuming that the operating temperature of node 20 is determined to be normal, kernel 11 selects node 20 to swap application 12 with. As such, nodes 10 and 20 may further include reception/transmission units 13 and 23 and processing units 14 and 24, which are coupled to the reception/transmission units 13 and 23. The reception/transmission units 13 and 23 and the processing units 14 and 24 are disposed within the respective nodes 10 and 20 and operated by kernels 11 and 21.

As noted above, once node 20 is selected, kernel 11 and kernel 21 communicate and thereby swap application 12 from node 10 to node 20. Again, the swap may include simply ending the running of the application 12 on node 10 and starting the same on node 20 or additionally moving text, global data, stack and heap of the application 12 between the first node 10 and node 20. Following the swap, at least one of the kernels 11 and 21 may notify the application 12 of the occurrence of the swap and at least one of the kernels 11 and 21 may perform a barrier operation. The barrier operation includes the sending of a signal to at least various kernels 11 and 21 that indicates that the swap has occurred and that an additional swap is not currently required.

In accordance with at least a second embodiment of the invention, the computing system 1 may further comprise a control system 30, which is configured to communicate with the temperature measurement system 40 to thereby compile the operating temperatures of each of the nodes 10 and 20 and with the kernels 11 and 21. Here, the control system 30 may be run on one or more of the nodes 10 and 20 in a networked fashion or may be remote. Where the control system 30 is remote, the control system 30 may include a separate computing apparatus which is coupled to the computing system 1 and which has software installed thereon to communicate with the temperature measurement system 40 and the kernels 11 and 21. In any case, in accordance with this embodiment, the determinations of whether nodes 10 and 20 are overheated and the selection of node 20, with which node 10 swaps application 12, are made by the control system 30.

As noted above, the temperature measurement system 40 may include temperature gauges 40a and 40b that are local to nodes 10 and 20, respectively, or some other suitable device for temperature measurement of the nodes 10 and 20 that may either be local to the nodes 10 and 20 or remote. In any case, the control system 30 is configured to poll the temperature measurement system 40 for the operating temperature of each of the nodes 10 and 20. Then, once the control system 30 has compiled the operating temperature measurements, in accordance with the example shown in FIG. 1, the control system 30 determines that node 10 is overheated and that node 20 has a normal operating temperature. As such, the control system 30 selects node 20 as a swap candidate for node 10 and notifies the kernels 11 and 21 that a swap of application 12 from node 10 to node 20 is to occur. To these ends, the control system 30 may include a reception/transmission unit 33, which is configured to communicate with the kernels 11 and 21, and a processing unit 34, coupled to the reception/transmission unit 33.

With reference to FIG. 2, a method of managing a process relocation operation in a computing system 1 is provided and includes determining respective operating temperatures of first, second and additional nodes 10 and 20 of the system 1 (operation 100). Where the first node 10 has an elevated operating temperature and the second node 20 has a normal operating temperature, the method further includes notifying first and second kernels 11 and 21 respectively associated with the first and second nodes 10 and 20, of a swapping condition (operation 110). At this point, the method includes initially managing the first and second kernels 11 and 21 to swap an application 12 between the first and the second nodes 10 and 20 while the swapping condition is in effect (operation 120), and secondarily managing the first and second kernels 11 and 21 to perform a barrier operation to end the swapping condition (operation 130).

Still referring to FIG. 2, the method may further include notifying the application 12 of the swap (operation 140). In addition, the initial management of the first and second kernels 11 and 21 to swap an application 12 between the first and the second nodes 10 and 20 may include swapping text, global data, stack and heap of the application (operation 125) and the barrier operation may include notifying at least the first and second nodes 10 and 20 that the swapping condition is ended (operation 135).

The determining of the operating temperatures may include measuring the operating temperature of the first, the second and the additional nodes 10 and 20 of the system 1 (operation 105) and/or remotely recording the operating temperatures of the first, the second and the additional nodes 10 and 20 of the system 1 (operation 106). Here, the operating temperature of the first node 10 may be broadcasted to the first kernel 11, the second kernel 21 and kernels of the additional nodes. Conversely, the operating temperature of the second kernel 21 may be received from the second kernel 21 and kernels of the additional nodes.

As noted above, in accordance with an embodiment of the invention, the method may further include cancelling or otherwise delaying the swapping condition (operation 150) before the initial management of the first and second kernels 11 and 21. Here, as long as the risk of running the application 12 on node 10 is determined to be below a certain threshold, such as where the application will be expected to run slowly but not crash, the swap from node 10 to node 20 may be overridden even where the operating temperatures of nodes 10 and 20 are elevated and normal, respectively. That is, if node 10 includes a much faster processor than node 20 or if node 20 is already fully queued with application 22 or other work, it may be determined that the swap will not be advantageous.

In accordance with an aspect of the invention, the methods described above may be embodied as a computer or machine readable medium having instructions stored thereon to execute the method.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A computing system in which process relocation operations are managed, the system comprising:
    a set of nodes, including a first node to run an application and other nodes;
    a temperature measurement system configured to determine an operating temperature of each of the nodes; and
    a set of kernels, respectively installed in each of the nodes, which are configured to communicate with one another and the temperature measurement system to thereby swap the running of the application from the first node to another node when the operating temperatures of the first node and the other node are each determined to be elevated and normal, respectively.

2. The system according to claim 1, wherein the temperature measurement system comprises a set of temperature measuring units which are each local to a corresponding one of the nodes.

3. The system according to claim 1, wherein text, global data, stack and heap of the application are swapped between the first node and the other node.

4. The system according to claim 1, wherein at least one of the kernels is configured to notify the application of the swap.

5. The system according to claim 1, wherein at least one of the kernels is configured to perform a barrier operation following the swap to end the swapping condition,
    the barrier operation comprising indicating to other kernels that the swap has occurred and that an additional swap is not currently required.

6. The system according to claim 1, wherein the kernel of the first node is configured to be interrupted upon the determination that the operating temperature of the first node is elevated.

7. The system according to claim 1, wherein the kernel of the first node is configured to broadcast that the operating temperature of the first node is elevated to the other nodes.

8. The system according to claim 7, wherein the kernel of the first node is further configured to select the other node when the operating temperature of the other node is determined to be normal.

9. A computing system in which process relocation operations are managed, the system comprising:
    a set of nodes, including a first node to run an application and other nodes;
    a temperature measurement system configured to determine an operating temperature of each of the nodes;
    a set of kernels, respectively installed in each of the nodes, which are configured to communicate with one another;
    a control system, configured to communicate with the temperature measurement system to compile the operating temperatures of each of the nodes and with the set of the kernels, and further configured to instruct the kernels to swap the running of the application from the first node to another node when the operating temperatures of the first node and the other node are each determined to be elevated and normal, respectively.

10. The system according to claim 9, wherein the temperature measurement system comprises a set of temperature measuring units which are each local to a corresponding one of the nodes.

11. The system according to claim 9, wherein the control system is configured to poll the temperature measurement system for the operating temperature of each of the nodes.

12. The system according to claim 9, wherein the control system is configured to select the other node.

13. A method of managing a process relocation operation in a computing system, comprising:
    determining respective operating temperatures of first, second and additional nodes of the system, the first, second and additional nodes of the system being configured to communicate with one another;
    where the first node has an elevated operating temperature and the second node has a normal operating temperature, notifying first and second kernels respectively associated with the first and second nodes, of a swapping condition;

initially managing the first and second kernels to swap an application between the first and the second nodes while the swapping condition is in effect; and secondarily managing the first and second kernels to perform a barrier operation to end the swapping condition.

14. The method according to claim 13, further comprising notifying the application of the swap.

15. The method according to claim 13, wherein the initial management of the first and second kernels to swap an application between the first and the second nodes comprises swapping text, global data, stack and heap of the application.

16. The method according to claim 13, wherein the barrier operation comprises notifying at least the first and second nodes that the swapping condition is ended by an indication that the swap has occurred and an indication that an additional swap is not currently required.

17. The method according to claim 13, wherein the determining of the operating temperature comprises measuring the operating temperature of the first, the second and the additional nodes of the system.

18. The method according to claim 13, further comprising:

broadcasting the operating temperature of the first node to the second kernel and kernels of the additional nodes; and receiving the operating temperature from the second kernel and kernels of the additional nodes.

19. The method according to claim 13, wherein the determining of the operating temperatures comprises remotely recording the operating temperatures of the first, the second and the additional nodes of the system.

20. The method according to claim 13, further comprising cancelling the swapping condition before the initial management of the first and second kernels.

21. The method according to claim 13, further comprising delaying the swapping condition until advantageous conditions arise.

22. The method according to claim 13, further comprising delaying the swapping condition while a node search is conducted.

* * * * *